(12) United States Patent
Yoshimura et al.

(10) Patent No.: US 12,730,288 B2
(45) Date of Patent: Sep. 8, 2026

(54) OPTICAL FILTERING DEVICE, METHOD OF CONTROLLING OPTICAL FILTERING DEVICE, AND MEMS SHUTTER

(71) Applicant: Hitachi High-Tech Corporation, Tokyo (JP)

(72) Inventors: Yasuhiro Yoshimura, Tokyo (JP); Masatoshi Kanamaru, Tokyo (JP); Takanori Aono, Tokyo (JP); Hitoyuki Tomotsune, Tokyo (JP); Yuko Otani, Tokyo (JP); Nobuhiko Kanzaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 362 days.

(21) Appl. No.: 18/278,487

(22) PCT Filed: Mar. 25, 2021

(86) PCT No.: PCT/JP2021/012664

§ 371 (c)(1),
(2) Date: Aug. 23, 2023

(87) PCT Pub. No.: WO2022/201459

PCT Pub. Date: Sep. 29, 2022

(65) Prior Publication Data

US 2024/0134175 A1 Apr. 25, 2024
US 2024/0231064 A9 Jul. 11, 2024

(51) Int. Cl.
*G02B 21/00* (2006.01)

(52) U.S. Cl.
CPC ................................ *G02B 21/0016* (2013.01)

(58) Field of Classification Search
CPC ................ G02B 21/0016; G02B 26/02; G01N 21/9501; G01N 21/956; G01N 21/362
(Continued)

(56) References Cited

U.S. PATENT DOCUMENTS 4,786,149 A 11/1988 Hoenig et al.
5,784,190 A * 7/1998 Worley ................. G02B 26/02 359/846

(Continued)

FOREIGN PATENT DOCUMENTS

JP 62-289807 A 12/1987
JP 09-218360 A 4/1997

(Continued)

OTHER PUBLICATIONS

International Search Report of PCT/JP2021/012664 dated Jun. 15, 2021.

(Continued)

*Primary Examiner* — Stephone B Allen
*Assistant Examiner* — Boutsikaris Leonidas
(74) *Attorney, Agent, or Firm* — MATTINGLY & MALUR, PC

(57) ABSTRACT

Provided is a highly reliable optical filtering device used as a spatial filter for an optical inspection apparatus and configured to prevent a shutter from sticking to a wall surface of a shutter opening. The optical filtering device includes the shutter openable and closeable by voltage control and a substrate having the shutter opening serving as a movable range of the shutter, in which the substrate includes a sticking prevention part configured to prevent the shutter from sticking to the wall surface of the shutter opening when the shutter is opened.

8 Claims, 10 Drawing Sheets

(58) Field of Classification Search
USPC .......................................................... 359/368
See application file for complete search history.

(56) References Cited

U.S. PATENT DOCUMENTS

| | | | | |
|---|---|---|---|---|
| 6,441,405 | B1 | 8/2002 | Smith et al. | |
| 2014/0160471 | A1* | 6/2014 | Ueno | G01N 21/9501 359/230 |
| 2017/0075105 | A1* | 3/2017 | Li | G02B 26/04 |

FOREIGN PATENT DOCUMENTS

| | | | | |
|---|---|---|---|---|
| JP | H09218360 | A | * | 8/1997 |
| JP | 11-249035 | A | | 9/1999 |
| JP | H11249035 | A | * | 9/1999 |
| JP | 2002-517320 | A | | 6/2002 |
| JP | 2003-315698 | A | | 11/2003 |
| JP | 2005-153057 | A | | 6/2005 |
| WO | 2012/105705 | A1 | | 8/2012 |

OTHER PUBLICATIONS

International Preliminary Report on Patentability of PCT/JP2021/012664 dated Apr. 4, 2022.

* cited by examiner

[FIG. 1]
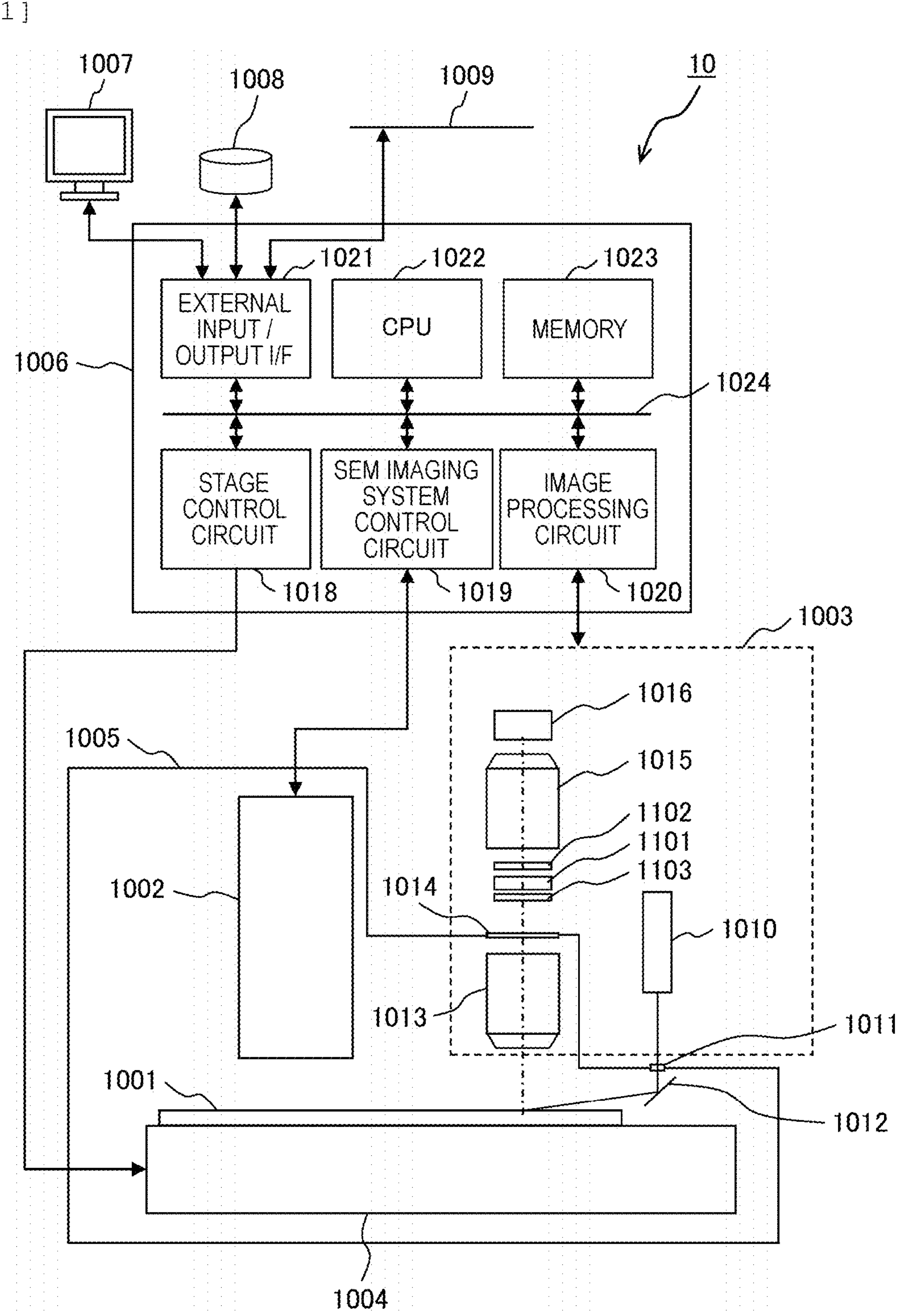

[FIG. 2]
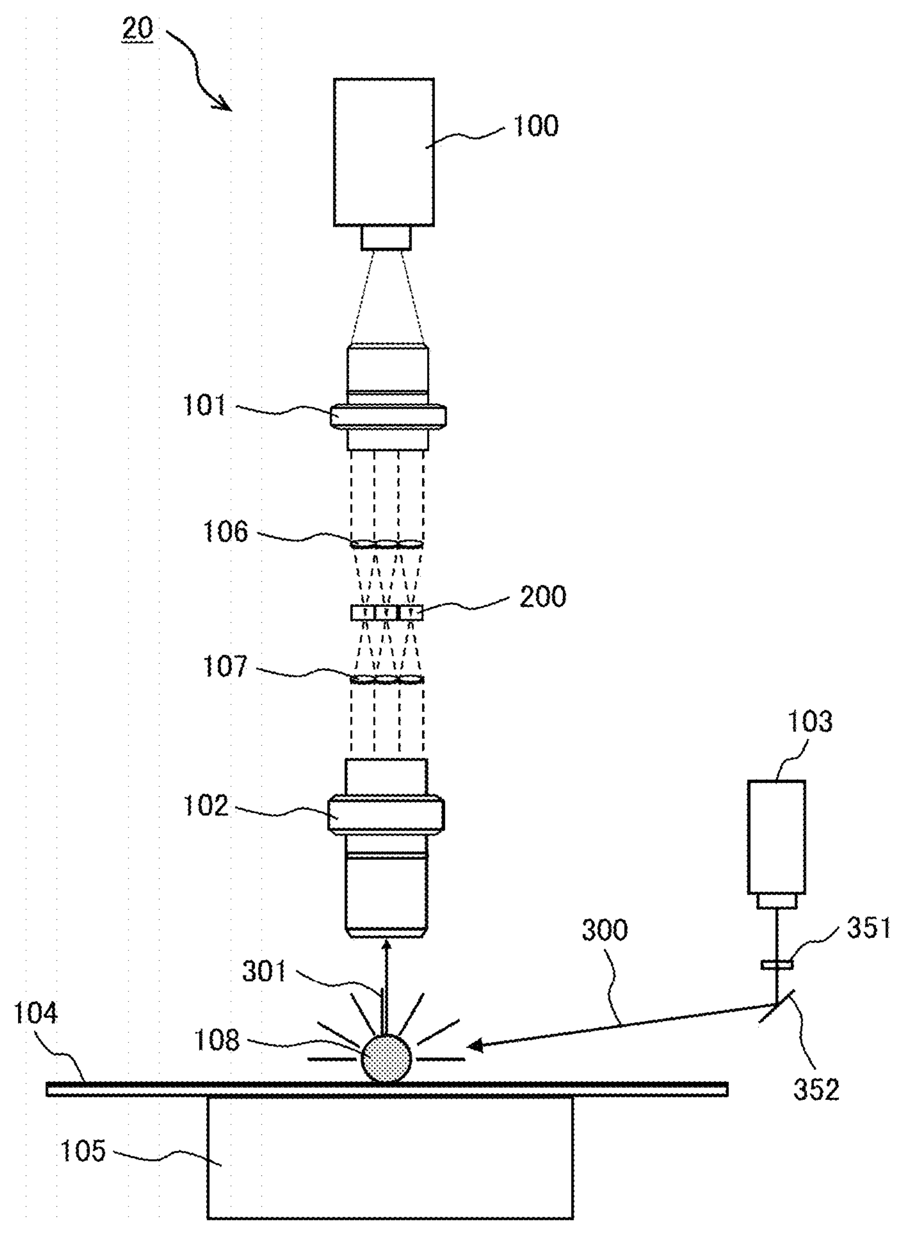

[FIG. 3A]
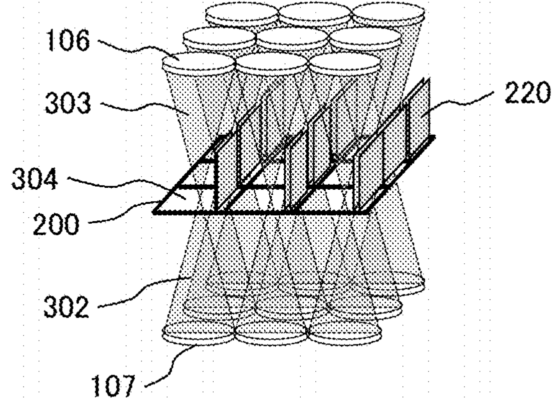
[FIG. 3B]
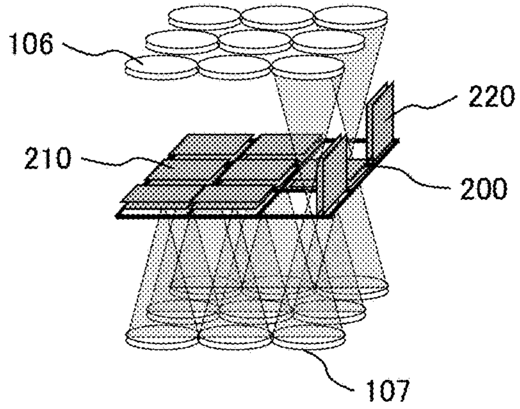
[FIG. 3C]
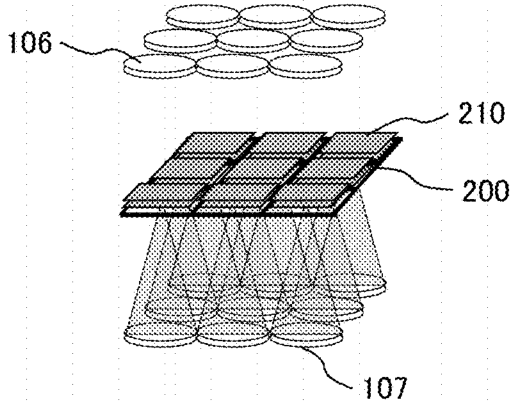

[FIG. 3D]
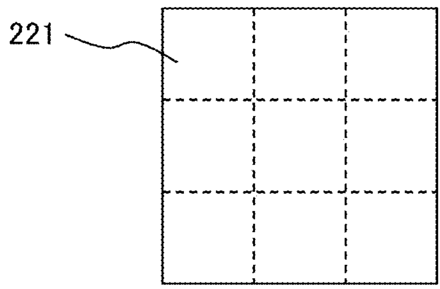
[FIG. 3E]
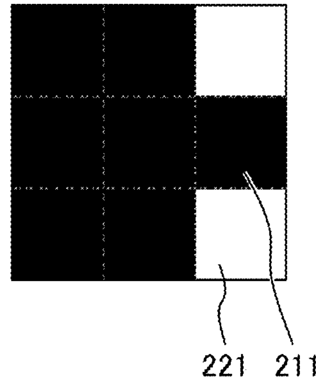
[FIG. 3F]
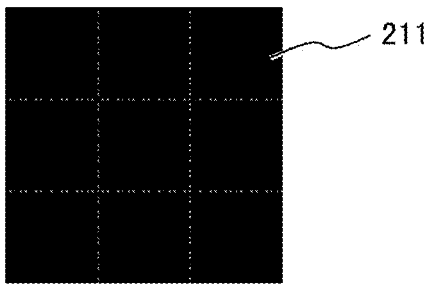

[FIG. 4]
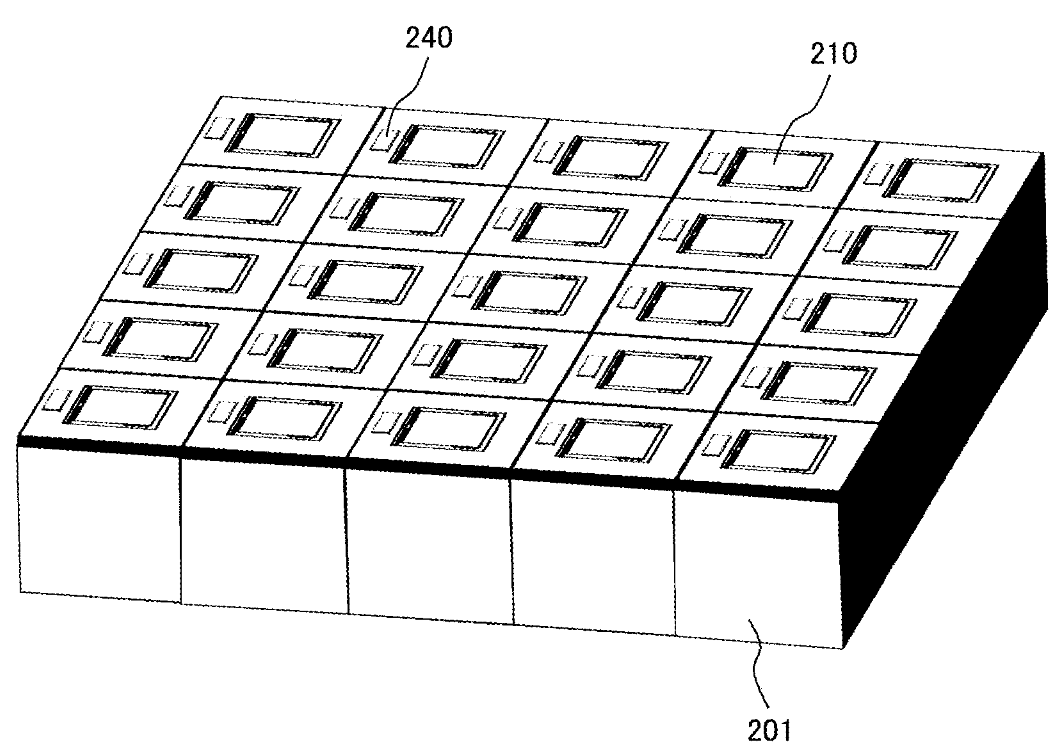
[FIG. 5]
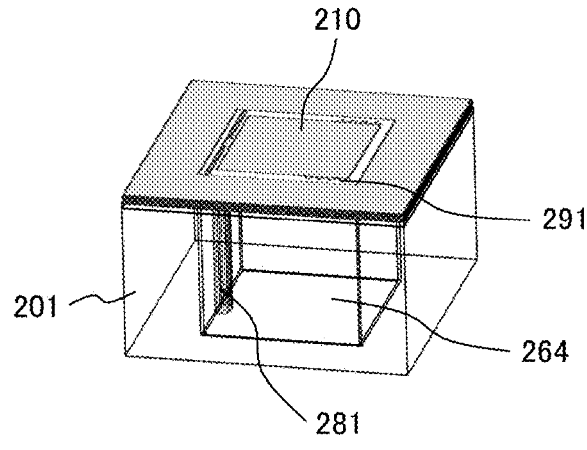

[FIG. 6A]
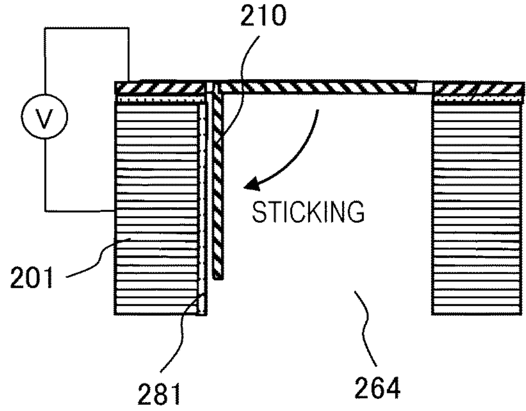
[FIG. 6B]
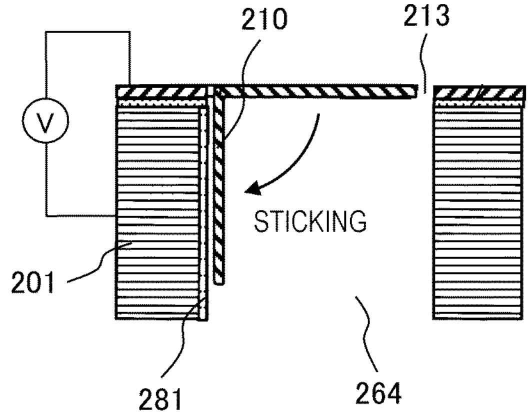
[FIG. 7]
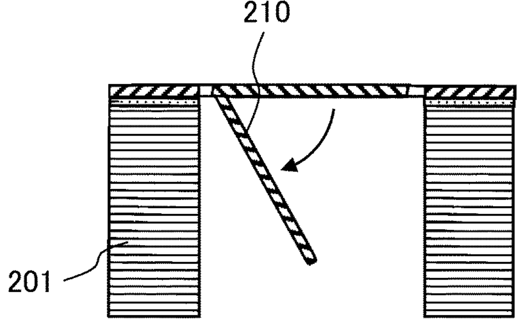

[FIG. 8]
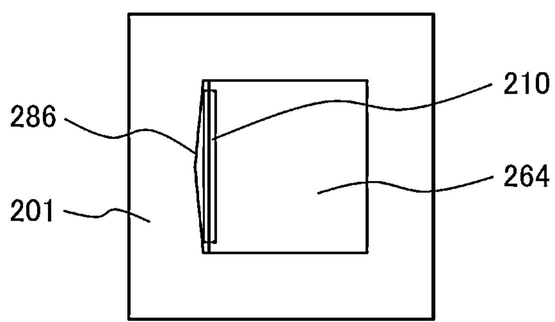
[FIG. 9]
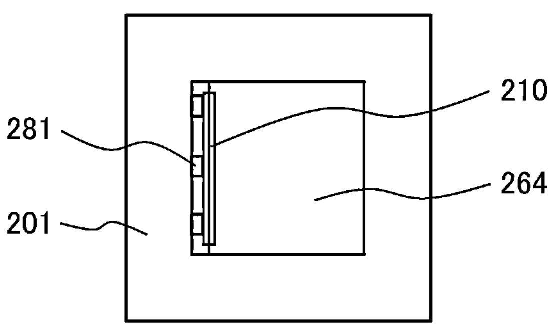
[FIG. 10]
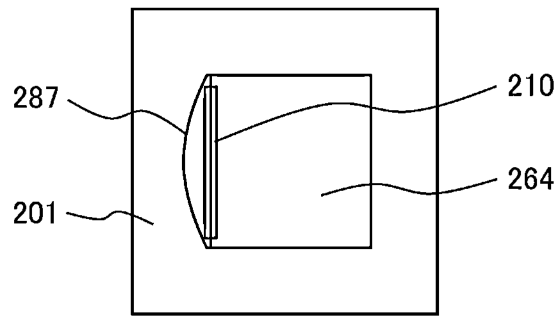

[FIG. 11]
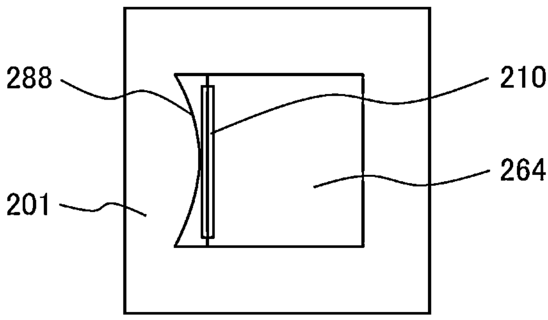
[FIG. 12]
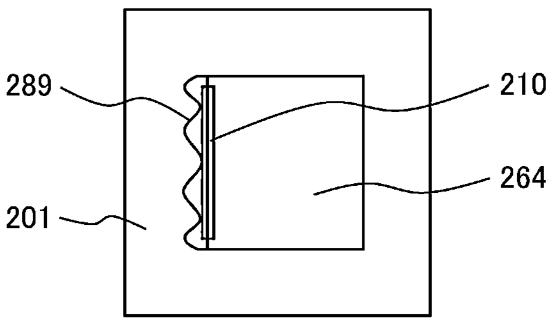
[FIG. 13]
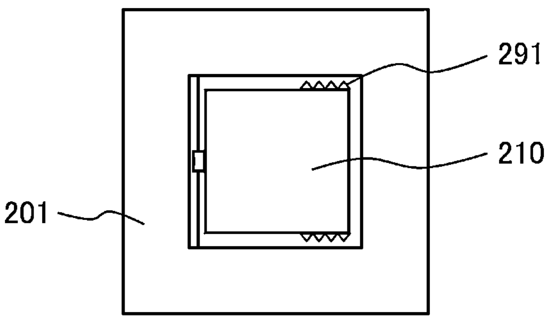

[FIG. 14]
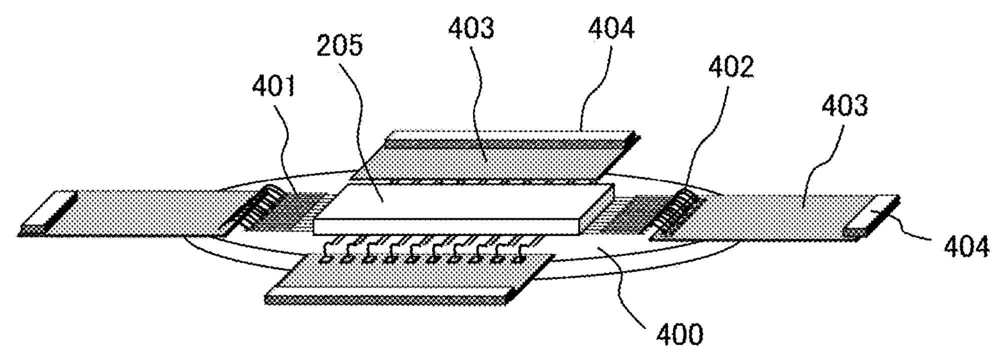
[FIG. 15]
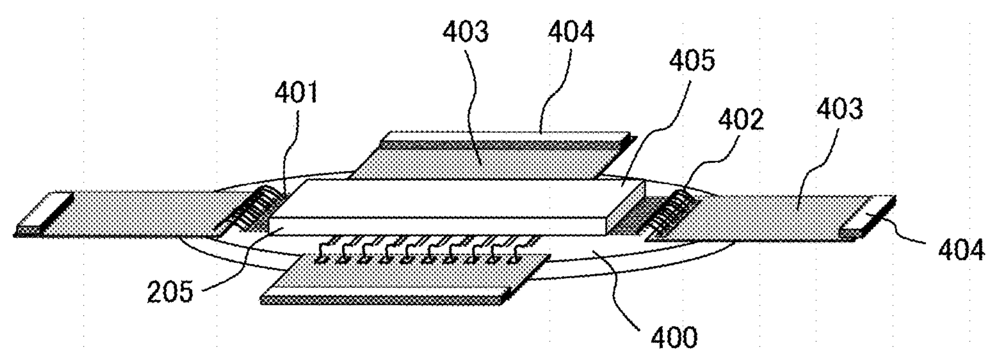

[FIG. 16]
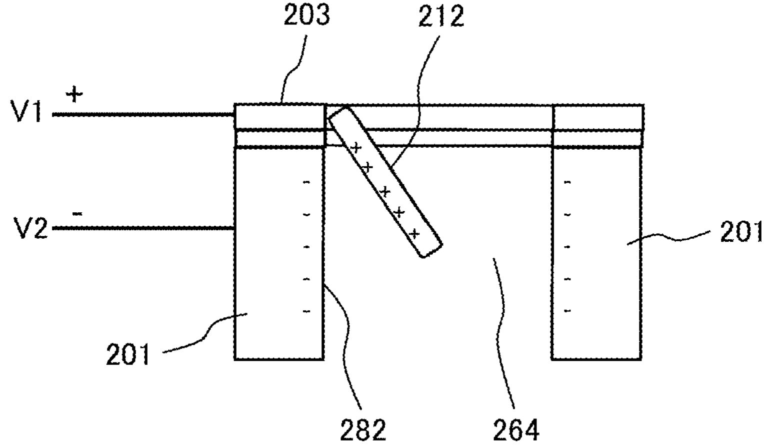
[FIG. 17]
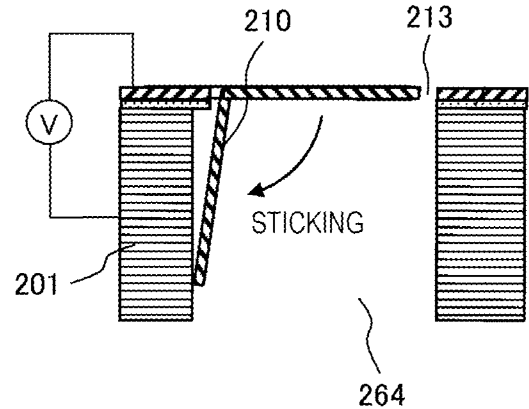

OPTICAL FILTERING DEVICE, METHOD OF CONTROLLING OPTICAL FILTERING DEVICE, AND MEMS SHUTTER

TECHNICAL FIELD

The present invention relates to a structure of an optical filtering device formed of MEMS, and more particularly to a technique effectively applied to a MEMS shutter mounted on an optical inspection apparatus.

BACKGROUND ART

A defect observation apparatus includes a scanning electron microscope (SEM) configured to review and classify various defects and foreign substances (hereinafter referred to as "defects and the like") that occur on the surface of a wafer, which is a semiconductor substrate, in a semiconductor manufacturing line.

It is desirable that the defect observation apparatus further includes an optical microscope. The defect observation apparatus has a function of controlling the optical microscope, efficiently and automatically detecting defects and the like on the wafer surface, and performing coordinate alignment. By controlling the SEM, a shape of the minute defects and the like detected by the optical microscope can be observed in detail and a component thereof can be analyzed. The optical microscope is desirably usable as a dark field optical microscope (DFOM).

Further, the defect observation apparatus has a function of automatically outputting an SEM image, classification data of defects and the like, elemental analysis data, and the like, and can also generate a defect map from the output data. Further, the defect observation apparatus can observe, classify, and analyze the defects and the like based on the generated defect map. For this reason, the defect observation apparatus is also referred to as a review SEM. The defect observation apparatus is also referred to as a defect review SEM (defect review-SEM) or a wafer inspection SEM.

In the defect observation apparatus, the optical microscope and the SEM have a common stage. Here, a wafer mounted on this stage can be observed with the optical microscope, positions of detected defects and the like can be specified, and the defects and the like can be observed with the SEM. For example, according to a defect map having accuracy of several tens of μm, a dark field microscope of the defect observation apparatus can be used to search for defects and the like in a range of several hundred nm, and positions of the defects and the like can be specified with accuracy of several μm or less.

Accordingly, it is possible to correct deviation of a coordinate system between the optical microscope and the SEM, to improve the success rate of defect observation, and to maintain high throughput. In addition, in the manufacturing process of a semiconductor device, it is possible to detect defects and the like causing an insulation failure of wiring, a short circuit thereof, and the like at an early stage, to determine a generation source of the detected defects and the like, and to prevent a decrease in yield.

In the dark field microscope, a pupil filter corresponding to the type of defects and the like is required, and there is a demand for a minute shutter having a dimension of 1 mm or less corresponding to various types of defects. It is considered that various spatial filters can be formed by opening and closing such a shutter.

In defect detection by a conventional dark field optical system that does not use such a shutter, spatial characteristics and polarization characteristics on the pupil plane of various defect scattered light are used to enhance a possibility of distinguishing between a defect and wafer roughness causing detection noise by a spatial filter and a polarizing filter.

The shape of the spatial filter that is advantageous for detection varies depending on the type of defect. Accordingly, in order to improve detection sensitivity of a plurality of types of defects, it is required to provide a mechanism configured to individually switch the opening and closing of shutters and a switching circuit configured to control the shutters using a shutter array in which minute shutters are arrayed. In this manner, by using a shutter switching mechanism, it is possible to select the opening/closing positions of the shutters, and to configure a plurality of types of spatial filters.

As a background art in this technical field, for example, there is a technique such as PTL 1. PTL 1 discloses "an optical filtering device including: a shutter array formed by arranging a shutter pattern two-dimensionally on an optically opaque thin film produced on an SOI wafer, the shutter array having a hole portion formed by removing the SOI wafer in a lower portion of the shutter pattern, and the shutter array having an operation electrode formed in a remaining portion of the SOI wafer; a glass substrate having an electrode pattern formed on a surface thereof, the glass substrate having the shutter array mounted thereon; and a power supply part configured to supply electric power to the electrode pattern formed on the glass substrate and the operation electrode of the SOI wafer, in which the shutter pattern formed to be arranged two-dimensionally is opened and closed with respect to the hole portion by controlling the electric power supplied from the power supply part to the electrode pattern and the operation electrode, and the shutter pattern has a protrusion at an end thereof".

CITATION LIST

Patent Literature

PTL 1: WO2012/105705A

SUMMARY OF INVENTION

Technical Problem

Meanwhile, in general, a shutter array device (optical filtering device) formed of micro electro mechanical systems (MEMS) is formed using a silicon on insulator (SOI) substrate in which $SiO_2$ is inserted between an Si substrate and a surface Si layer. Here, when a shutter is fully opened, the opened shutter sticks to the wall surface of a shutter opening provided on the Si substrate due to the effects of static electricity and moisture in the atmosphere. Thereafter, it may become impossible to control the opening and closing of the shutter.

PTL 1 does not describe the above-described problem that the shutter sticks to the Si substrate or a method of solving the problem.

Therefore, an object of the present invention is to provide a highly reliable optical filtering device used as a spatial filter for an optical inspection apparatus and configured to prevent a shutter from sticking to a wall surface of a shutter opening.

Solution to Problem

In order to solve the above-described problem, the present invention includes a shutter openable and closeable by voltage control and a substrate having a shutter opening serving as a movable range of the shutter, in which the substrate includes a sticking prevention part configured to prevent the shutter from sticking to a wall surface of the shutter opening when the shutter is opened; the sticking prevention part is a protrusion disposed on the wall surface of the shutter opening; the protrusion is disposed to extend over the entire of a thickness direction of the substrate; and any cross section in the thickness direction of the substrate has an approximately same shape.

Further, the present invention provides an optical filtering device control method of controlling an optical filtering device, the method including applying, when the shutter is opened, a predetermined voltage so that the shutter remains stationary in a space of the shutter opening without contacting a wall surface of the shutter opening.

Advantageous Effects of Invention

According to the present invention, in an optical filtering device used as a spatial filter for an optical inspection apparatus, it is possible to realize a highly reliable optical filtering device capable of preventing a shutter from sticking to a wall surface of a shutter opening.

Accordingly, it is possible to improve reliability of an optical inspection apparatus, a dark field optical microscope, a defect inspection apparatus, and a review SEM.

Problems, configurations, and effects other than those described above will be clarified by descriptions of the following embodiments.

BRIEF DESCRIPTION OF DRAWINGS

FIG. 1 is a diagram showing a schematic configuration of a defect observation apparatus according to an embodiment 1.

FIG. 2 is a diagram showing a schematic configuration of an optical microscope, which is a defect detection unit of the defect observation apparatus in FIG. 1.

FIG. 3A is a schematic enlarged view showing a shutter array device and a microlens array.

FIG. 3B is a schematic enlarged view showing a state in which shutters forming the shutter array device in FIG. 3A are partially closed.

FIG. 3C is a schematic enlarged view showing a state in which all the shutters forming the shutter array device in FIG. 3A are closed.

FIG. 3D is a diagram showing a spatial filter corresponding to the state of the shutter array device in FIG. 3A.

FIG. 3E is a diagram showing a spatial filter corresponding to the state of the shutter array device in FIG. 3B.

FIG. 3F is a diagram showing a spatial filter corresponding to the state of the shutter array device in FIG. 3C.

FIG. 4 is a perspective view showing an example of a shutter array device (5×5 array).

FIG. 5 is a perspective view showing one shutter array according to an embodiment 1.

FIG. 6A is a diagram showing an operation of the shutter.

FIG. 6B is a diagram showing a modification of FIG. 6A.

FIG. 7 is a cross-sectional view showing a shutter array according to an embodiment 2.

FIG. 8 is a top view of a shutter array according to an embodiment 3. (When a shutter is fully opened).

FIG. 9 is a top view of a shutter array according to an embodiment 4. (When a shutter is fully opened).

FIG. 10 is a top view of a shutter array according to an embodiment 5. (When a shutter is fully opened).

FIG. 11 is a top view of a shutter array according to an embodiment 6. (When a shutter is fully opened).

FIG. 12 is a top view of a shutter array according to an embodiment 7. (When a shutter is fully opened).

FIG. 13 is a top view of a shutter array according to an embodiment 8. (When a shutter is closed).

FIG. 14 is a perspective view showing a mounting structure of a shutter array device according to an embodiment 10.

FIG. 15 is a perspective view showing a mounting structure of a shutter array device according to an embodiment 11.

FIG. 16 is a diagram schematically showing a voltage application state of the shutter array.

FIG. 17 is a cross-sectional view showing a shutter array according to an embodiment 9.

DESCRIPTION OF EMBODIMENTS

Hereinafter, embodiments of the present invention will be described with reference to the drawings. It is noted that detailed descriptions of overlapping portions are omitted.

Embodiment 1

First, an optical inspection apparatus and an optical filtering device to which the present invention is applied will be described with reference to FIGS. 1 to 3F. In the present embodiment, as an example of the optical inspection apparatus, a defect observation apparatus for observing and inspecting defects and the like on a wafer will be described.

FIG. 1 is a diagram showing a schematic configuration of a defect observation apparatus according to the present embodiment. FIG. 2 is a diagram showing a schematic configuration of an optical microscope, which is a defect detection unit of the defect observation apparatus in FIG. 1. FIGS. 3A to 3C are schematic enlarged views showing a shutter array device and a microlens array, and respectively show a state in which shutters are fully opened (FIG. 3A), a state in which the shutters are partially closed (FIG. 3B), and a state in which the shutters are fully closed (FIG. 3C). FIGS. 3D to 3F are diagrams showing spatial filters corresponding to FIGS. 3A to 3C, respectively.

As shown in FIG. 1, a defect observation apparatus 10 of the present embodiment includes a scanning electron microscope (SEM) 1002, an optical microscope 1003, which is a defect detection unit, a control unit 1006, a terminal 1007, a recording device 1008, and a network 1009.

The scanning electron microscope 1002 is installed in a vacuum chamber 1005 together with a stage 1004. A wafer 1001 is placed on the stage 1004. The wafer 1001 can be moved with the stage 1004 that is movable in the X-axis and the Y-axis. Accordingly, any surface of the wafer 1001 can be observed with the scanning electron microscope 1002 and the optical microscope 1003.

The optical microscope 1003 includes a laser light source 1010, an objective lens 1013, an image forming lens 1015, and an imaging element 1016.

The objective lens 1013 is installed inside the vacuum chamber 1005. Therefore, a vacuum sealing window 1014 is provided so that light passing through the objective lens 1013 reaches the imaging element 1016. A microlens array 1103, a shutter array device 1101, and a microlens array 1102 are installed in order from the vacuum sealing window 1014 side between the vacuum sealing window 1014 and the image forming lens 1015. A light beam emitted from the laser light source 1010 is configured to pass through a vacuum sealing window 1011 and to be emitted to the upper surface of the wafer 1001 via a mirror 1012.

Light reflected by the upper surface of the wafer 1001 passes through the objective lens 1013 and the vacuum sealing window 1014 in order. Thereafter, the light passes through the microlens array 1103, the shutter array device 1101, and the microlens array 1102 in order, an image is formed by the image forming lens 1015, and the image is detected by the imaging element 1016.

As the imaging element 1016, a two-dimensional CCD sensor, a line CCD sensor, a TDI sensor group in which a plurality of TDIs are disposed in parallel, a photodiode array, and the like are used. Here, CCD is an abbreviation for a charge-coupled device. Further, TDI is an abbreviation for time delay integration.

The scanning electron microscope 1002 and the optical microscope 1003 are fixed so as to keep an accurate distance.

The control unit 1006 includes a stage control circuit 1018, an SEM imaging system control circuit 1019, an image processing circuit 1020, an external input/output interface 1021, a central processing unit 1022 (CPU), and a memory 1023.

The stage control circuit 1018, the SEM imaging system control circuit 1019, and the image processing circuit 1020 are connected, via a bus 1024, to the external input/output interface 1021, the central processing unit 1022, and the memory 1023.

The stage control circuit 1018, the SEM imaging system control circuit 1019, and the image processing circuit 1020 are circuits for moving the wafer 1001, observing defects and the like on the surface of the wafer 1001, and performing other operations. The image processing circuit 1020 integrates signals of images acquired by the imaging element 1016, performs data conversion, determines the type of defects and the like, and specifies its position and dimension. Information on the results of determination, specification, and the like will be referred to as "defect information" in this specification.

The defect information is input to the recording device 1008 or the memory 1023. The memory 1023 is mainly used for temporary storage. On the other hand, the recording device 1008 can be used to accumulate and store the acquired defect information.

In the control unit 1006, the stage control circuit 1018 controls the stage 1004 and the SEM imaging system control circuit 1019 controls the scanning electron microscope 1002 based on the defect information. Then, the control unit 1006 observes some or all of the defects and the like detected by the optical microscope 1003 in detail, classifies the defects and the like, and analyzes occurrence cause thereof. The control unit 1006 also controls the focus and output of an SEM image, controls analysis, analyzes data obtained by the scanning electron microscope 1002, and corrects the positions of defects and the like obtained by the optical microscope 1003. Furthermore, the control unit 1006 can perform display on the terminal 1007, data transfer via the network 1009, and the like.

The terminal 1007 sets conditions for observing defects and the like. Further, the terminal 1007 sets parameters for controlling the scanning electron microscope 1002, the optical microscope 1003, and the stage 1004. In addition, the terminal 1007 also performs a setting related to opening and closing operations of a shutter (described later) of the shutter array device 1101. Furthermore, in the terminal 1007, an angle at which the shutter is opened (opening angle) can be adjusted to an appropriate value. In this case, it may be possible to adopt a method of adjusting a voltage applied to the shutter array device 1101 while confirming, using the terminal 1007, an image obtained by converting an image obtained by the imaging element 1016 into a pupil image. Accordingly, it is possible to prevent failures such as sticking of a shutter to a substrate, the sticking being caused by excessive opening of the shutter, and breakage of a shaft part of the shutter.

The shaft part of the shutter has a force acting as an elastic body that tends to return to the closed state of the shutter against stress in the open state of the shutter. The opening angle is determined by a balance between the above-mentioned force and an electrostatic force that tends to open the shutter, the electrostatic force being generated by the voltage application. Accordingly, the opening angle can be adjusted by adjusting the voltage. An upper limit value of the opening angle of the shutter is determined by the above-mentioned voltage.

The optical microscope 1003, which is the defect detection unit of the defect observation apparatus 10 in FIG. 1, will be described in detail with reference to FIG. 2. In FIG. 2, reference numerals different from those in FIG. 1 are used. For example, a reference numeral 20 is used to indicate the optical microscope. However, the configuration and function of each part are the same as those in FIG. 1.

As shown in FIG. 2, the optical microscope 20 of the present embodiment includes an imaging element (sensor) 100, an image forming lens 101, and an objective lens 102. Microlens arrays 106 and 107 are installed between the image forming lens 101 and the objective lens 102. A shutter array device 200 (optical filtering device) is installed between the microlens arrays 106 and 107. The microlens arrays 106 and 107 and the shutter array device 200 are installed near the pupil plane of the optical microscope 20.

The objective lens 102 is configured so that a light beam 300 emitted from a laser light source 103 to a wafer 104 is reflected by the surface of the wafer 104 and reflected light 301 is incident on the objective lens 102. The light passing through the objective lens 102 passes through the pupil plane (Fourier transform plane) and the image forming lens 101, reaches the imaging element 100, and is detected as an electrical signal. The light beam 300 emitted from the laser light source 103 is transmitted through a vacuum sealing window 351, reflected by a mirror 352, and emitted to the wafer 104.

When there is a defect 108 on the wafer 104, the light beam 300 that hits the defect 108 is reflected and the abnormal reflected light 301 is generated. This reflected light 301 can be detected by the imaging element 100, and data corresponding to an image of the defect 108 can be acquired by the image processing circuit 1020 in FIG. 1. By moving a stage 105, the defect 108 existing on the surface of the wafer 104 can be found.

The shutter array device and the microlens array in FIGS. 1 and 2 will be described in detail with reference to FIGS. 3A to 3F.

FIG. 3A shows a state in which shutters 220 of the shutter array device 200 are all opened. In FIG. 3A, the shutter array device 200 is placed between the microlens arrays 106 and 107. All the shutters 220 of the shutter array device 200 are opened. Therefore, reflected light 302 passing through the shutter array device 200 is converged and focused on a shutter opening 304 to become light 303.

FIG. 3B shows a state in which shutters other than a portion of the shutters 220 of the shutter array device 200 are closed. Further, FIG. 3C also shows a state in which all shutters 210 of the shutter array device 200 are closed. In this manner, the plurality of shutters (closed) 210 and shutters (open) 220 have configurations that can be opened and closed independently.

FIGS. 3D to 3F show spatial filters corresponding to the states shown in FIGS. 3A to 3C, respectively. FIGS. 3D to 3F are diagrams viewed from above or below the shutter array device 200.

In these drawings, a shutter closed state 211 is represented in black and a shutter open state 221 is represented in white. A plurality of types of spatial filters (spatial masks) can be configured by individually controlling ON/OFF for each pixel of the shutter array device 200.

In FIGS. 3A to 3C, the shutters 210 and 220 of the shutter array device 200 and the lenses of the microlens arrays 106 and 107 are arranged in three rows and three columns, but this arrangement is only an example. A larger matrix may be formed if necessary.

Next, with reference to FIGS. 6A, 6B, and 16, the problems to be solved by the present invention will be described in detail. FIGS. 6A and 6B are vertical cross-sectional views of one shutter in the shutter array device 200, and both drawings show the operation of the shutter. FIG. 16 is a diagram schematically showing a voltage application state of the shutter array.

In addition, since a space (gap 213) is often provided between the shutter 210 and a substrate 201 in an actual product, FIG. 6B is shown as a modification of FIG. 6A.

As shown in FIG. 16, a voltage is applied to a shutter 212 through a shutter supporting part 203 so as to have a positive potential (V1), and a voltage is applied to the substrate 201 so as to have a negative potential (V2). As a result, an electrostatic force is generated by a potential difference, and the shutter 212 is opened.

As shown in this drawing, the lower surface of the shutter 212 is positively charged, and an inner wall surface 282 of the substrate 201 is negatively charged. Accordingly, the shutter 212 rotates around a shaft part and moves to a shutter opening 264, thereby opening the shutter. When the voltage application is stopped, the shutter is returned to the closed state by a restoring force of the shaft part.

For example, when V1 has a positive potential of +10 to 100 V and V2 has a negative potential of −10 to −100 V, a voltage to be applied is 20 to 200 V. However, the voltage also changes depending on the size of the shutter 212, and thus the present invention is not limited to the above-described example.

As shown in FIGS. 6A and 6B, when the shutter 212 (210) is fully opened, the open shutter 212 (210) sticks to the wall surface of the shutter opening 264 provided on the substrate 201 due to static electricity and moisture in the atmosphere. Thereafter, the opening/closing control of the shutter 212 (210) may become impossible.

Next, the optical filtering device of the present embodiment will be described with reference to FIGS. 4 to 6B. FIG. 4 is a perspective view showing an example (5×5 array) of the shutter array device of the present embodiment. FIG. 5 is a perspective view showing one shutter array of the present embodiment.

The optical filtering device of the present embodiment, as shown in FIG. 4, is formed of a 5×5 array in which 25 shutter arrays are arranged vertically and horizontally in the five-by-five matrix. Each of the shutter arrays is provided with an electrode pad 240, and the opening and closing of the shutter 210 are controlled as described above by applying a voltage to the shutter 210 through the electrode pad 240.

Here, in the optical filtering device of the present embodiment, as shown in FIGS. 5 to 6B, a protrusion 281 is provided to prevent the shutter 210 from sticking to the wall surface of the shutter opening 264 when the shutter 210 is opened. By providing the protrusion 281 on the wall surface of the shutter opening 264, a gap is formed between the shutter 210 and the wall surface of the shutter opening 264, thereby making it possible to prevent the shutter 210 from sticking to the wall surface of the shutter opening 264.

It is noted that, as shown in FIG. 5, it is desirable to dispose the protrusion 281 so as to extend in the thickness direction of the substrate 201. Accordingly, it is possible to reliably prevent the shutter 210 from sticking to the wall surface of the shutter opening 264 over the entire thickness direction of the substrate 201.

As described above, the optical filtering device of the present embodiment includes the shutter 210 capable of being opened and closed by voltage control, and the substrate 201 having the shutter opening 264 serving as a movable range of the shutter 210. The substrate 201 is configured to have the protrusion (sticking prevention part) 281 configured to prevent the shutter 210 from sticking to the wall surface of the shutter opening 264 when the shutter 210 is opened.

Accordingly, in an optical filtering device used as a spatial filter for an optical inspection apparatus, it is possible to realize a highly reliable optical filtering device capable of preventing a shutter from sticking to the wall surface of a shutter opening. Accordingly, it is possible to improve reliability of an optical inspection apparatus, a dark field optical microscope, a defect inspection apparatus, and a review SEM.

Embodiment 2

A method of controlling an optical filtering device according to an embodiment 2 of the present invention will be described with reference to FIG. 7. FIG. 7 is a cross-sectional view showing a shutter array of the present embodiment.

In the present embodiment, as shown in FIG. 7, when the shutter 210 is opened, a predetermined voltage is controlled to be applied to the shutter 210 so that the shutter 210 remains stationary in the space of the shutter opening 264 without contacting the wall surface of the shutter opening 264.

By stopping the opening/closing operation of the shutter 210 in the middle of the shutter opening 264, which is the movable range of the shutter 210, without fully opening the shutter 210, the shutter 210 does not contact the wall surface of the shutter opening 264, thereby making it possible to prevent the shutter 210 from sticking to the wall surface of the shutter opening 264.

Embodiment 3

An optical filtering device according to an embodiment 3 of the present invention will be described with reference to FIG. 8. FIG. 8 is a top view of a shutter array of the present embodiment, and shows a state when a shutter is fully opened.

In the present embodiment, as shown in FIG. 8, the wall surface of the shutter opening 264 is formed with an inclined surface 286 so that any cross section in the thickness direction of the substrate 201 has an approximately dogleg shape.

By providing the inclined surface 286 on the wall surface of the shutter opening 264 as in the present embodiment, it is possible to form a portion at which the shutter 210 and the wall surface of the shutter opening 264 do not contact each other, thereby making it possible to prevent the shutter 210 from sticking to the wall surface of the shutter opening 264.

Embodiment 4

An optical filtering device according to an embodiment 4 of the present invention will be described with reference to FIG. 9. FIG. 9 is a top view of a shutter array of the present embodiment, and shows a state when a shutter is fully opened.

In the present embodiment, as shown in FIG. 9, a plurality (three in FIG. 9) of the protrusions 281 described in the embodiment 1 (FIG. 5) are disposed on the wall surface of the shutter opening 264.

As in the present embodiment, the plurality of protrusions 281 are disposed, thereby making it possible to more reliably prevent the shutter 210 from sticking to the wall surface of the shutter opening 264.

Embodiment 5

An optical filtering device according to an embodiment 5 of the present invention will be described with reference to FIG. 10. FIG. 10 is a top view of a shutter array of the present embodiment, and shows a state when a shutter is fully opened.

In this embodiment, as shown in FIG. 10, the wall surface of the shutter opening 264 is formed with a concave curved surface 287.

By providing the concave curved surface 287 on the wall surface of the shutter opening 264 as in the present embodiment, it is possible to form a portion at which the shutter 210 and the wall surface of the shutter opening 264 do not contact each other, thereby making it possible to prevent the shutter 210 from sticking to the wall surface of the shutter opening 264.

Embodiment 6

An optical filtering device according to an embodiment 6 of the present invention will be described with reference to FIG. 11. FIG. 11 is a top view of a shutter array of the present embodiment, and shows a state when a shutter is fully opened.

In the present embodiment, as shown in FIG. 11, the wall surface of the shutter opening 264 is formed with a convex curved surface 288.

By providing the convex curved surface 288 on the wall surface of the shutter opening 264 as in the present embodiment, it is possible to form a portion at which the shutter 210 and the wall surface of the shutter opening 264 do not contact each other, thereby making it possible to prevent the shutter 210 from sticking to the wall surface of the shutter opening 264.

Embodiment 7

An optical filtering device according to an embodiment 7 of the present invention will be described with reference to FIG. 12. FIG. 12 is a top view of a shutter array of the present embodiment, and shows a state when a shutter is fully opened.

In the present embodiment, as shown in FIG. 12, the wall surface of the shutter opening 264 is formed with a wave-shaped uneven surface 289.

By providing the wave-shaped uneven surface 289 on the wall surface of the shutter opening 264 as in the present embodiment, it is possible to form a portion at which the shutter 210 and the wall surface of the shutter opening 264 do not contact each other, thereby making it possible to prevent the shutter 210 from sticking to the wall surface of the shutter opening 264.

Embodiment 8

An optical filtering device according to an embodiment 8 of the present invention will be described with reference to FIG. 13. FIG. 13 is a top view of a shutter array of the present embodiment, and shows a state when a shutter is closed.

For example, in the optical filtering device described in the embodiment 1 (FIG. 5), the shutter 210 may stick to the wall surface of the shutter opening 264 when the shutter 210 is closed. As described with reference to FIG. 6B, in the actual product, the space (gap 213) is often provided between the shutter 210 and the substrate 201. Here, when the space (gap 213) is extremely narrow, the shutter 210 may stick to the wall surface of the shutter opening 264.

Therefore, in the present embodiment, a shutter plate uneven part 291 (sticking prevention part) is provided on the shutter 210 to prevent the shutter 210 from sticking to the wall surface of the shutter opening 264 when the shutter 210 is closed.

By providing the shutter plate uneven part 291 on a surface of the shutter 210, the surface facing the wall surface of the shutter opening 264, as in the present embodiment, it is possible to prevent the shutter 210 from sticking to the wall surface of the shutter opening 264 when the shutter is fully opened, and it is also possible to prevent the shutter 210 from sticking to the wall surface of the shutter opening 264 when the shutter is closed.

Embodiment 9

An optical filtering device according to an embodiment 9 of the present invention will be described with reference to FIG. 17. FIG. 17 is a cross-sectional view of a shutter array of the present embodiment, and shows a state when a shutter is fully opened.

In the present embodiment, as shown in FIG. 17, the wall surface of the shutter opening 264 that contacts the shutter 210 when the shutter 210 is fully opened is structured to retreat from a rotating shaft (not shown) of the shutter 210. That is, the shutter 210 is opened 90 degrees or more. Therefore, a tip portion of the shutter 210 contacts the wall surface of the shutter opening 264, and a contact area therebetween is reduced, thereby making it possible to prevent the shutter 210 from sticking thereto.

Embodiment 10

A mounting structure of a shutter array device according to an embodiment 10 of the present invention will be described with reference to FIG. 14. FIG. 14 is a perspective view showing the mounting structure of the shutter array device of the present embodiment.

The optical filtering device described in the embodiments 1 to 9 can be mounted, for example, in a form as shown in FIG. 14.

As shown in FIG. 14, the mounting structure of the shutter array device of the present embodiment is configured to include a shutter array 205 in which shutters are arrayed, and a wiring substrate 400 having the shutter array 205 mounted thereon and a wiring 401 that supplies a voltage to open and close each shutter of the shutter array 205.

The wiring 401 is connected, via a bonding wire 402, to a flexible substrate 403 different from the wiring substrate 400, and is electrically connected to an external control device (not shown) via a connector 404 of the flexible substrate 403.

By adopting the mounting structure as described in the present embodiment, a voltage supplied from the external control device is applied to the electrode pad 240 (refer to FIG. 4) of each shutter array, thereby making it possible to control the opening and closing of the shutter 210.

Embodiment 11

A mounting structure of a shutter array device according to an embodiment 11 of the present invention will be described with reference to FIG. 15. FIG. 15 is a perspective view showing the mounting structure of the shutter array device of the present embodiment.

In the present embodiment, quartz glass (protective cover) 405 covering the shutter array 205 is further provided in the mounting structure of the shutter array device of the embodiment 10 (in FIG. 14).

For example, the quartz glass 405 is bonded to the upper surface of the shutter array 205 to be sealed therebetween by performing bonding using an adhesive material or bonding using other bonding means, thereby making it possible to protect the shutter array 205 from dust and moisture in the atmosphere.

In addition, in the embodiments 1 and 3 to 7, a description has been given as to an example in which the wall surface of the shutter opening 264 is provided with a convex portion or a concave portion, and at least one of the convex portion and the concave portion may be provided on a wall surface of the shutter opening 264, the wall surface facing the shutter 210 when the shutter 210 is opened.

In addition, the present invention is not limited to the above-described embodiments, and includes various modifications.

For example, the above-described embodiments have been described in detail in order to explain the present invention in an easy-to-understand manner, and are not necessarily limited to those having all the described configurations. Further, a part of a configuration of one embodiment can be replaced with a configuration of another embodiment, and the configuration of another embodiment can be added to the configuration of one embodiment. Furthermore, other configurations can be added, deleted, and replaced with respect to a part of the configuration of each embodiment.

REFERENCE SIGNS LIST

10: defect observation apparatus
20, 1003: optical microscope (defect detection unit)
100, 1016: imaging element (sensor)
101, 1015: image forming lens
102, 1013: objective lens
103, 1010: laser light source
104, 1001: wafer
105, 1004: stage
106, 107, 1102, 1103: microlens array
108: defect
200, 1101: shutter array device
201: substrate
203: shutter supporting part
205: shutter array
210, 212: shutter
211: shutter closed state
213: gap
220: shutter
221: shutter open state
240: electrode pad
264: shutter opening
281: protrusion
282: inner wall surface (of substrate 201)
286: inclined surface
287: concave curved surface
288: convex curved surface
289: wave-shaped uneven surface
291: shutter plate uneven part
300: light beam
301, 302: reflected light
303: light
304: shutter opening
351, 1011, 1014: vacuum sealing window, vacuum sealing window
352, 1012: mirror
400: wiring substrate
401: wiring
402: bonding wire
403: flexible substrate
404: connector
405: quartz glass
1002: scanning electron microscope (SEM)
1005: vacuum chamber
1006: control unit
1007: terminal
1008: recording device
1009: network
1018: stage control circuit
1019: SEM imaging system control circuit
1020: image processing circuit
1021: external input/output interface
1022: central processing unit
1023: memory
1024: bus

The invention claimed is:

1. An optical filtering device comprising:
a shutter openable and closeable by voltage control; and
a substrate having a shutter opening serving as a movable range of the shutter,
wherein:
the substrate includes a sticking prevention part configured to prevent the shutter from sticking to a wall surface of the shutter opening when the shutter is opened;
the sticking prevention part is a protrusion disposed on the wall surface of the shutter opening;
the protrusion is disposed to extend over the entire of a thickness direction of the substrate; and
any cross section in the thickness direction of the substrate has an approximately same shape.

2. The optical filtering device according to claim 1, wherein a plurality of the protrusions are disposed on the wall surface of the shutter opening.

3. The optical filtering device according to claim 1, wherein:
the shutter includes a sticking prevention part configured to prevent the shutter from sticking to a right or left wall surface of the shutter opening when the shutter is closed; and the sticking prevention part includes uneven surfaces provided at both sides of the shutter, the uneven surfaces facing the wall surface of the shutter opening.

4. The optical filtering device according to claim 1, further comprising:

a shutter array in which the shutters are arrayed;

a wiring substrate having the shutter array mounted thereon, wherein the wiring substrate has wiring that supplies a voltage to open and close each shutter of the shutter array; and a protective cover configured to cover the shutter array.

5. The optical filtering device according to claim 1, wherein the optical filtering device is mounted on any one of an optical inspection apparatus, a dark field optical microscope, a defect inspection apparatus, and a review SEM.

6. An optical filtering device control method of controlling the optical filtering device according to claim 3, the method comprising:

applying, when the shutter is opened, a predetermined voltage so that the shutter remains stationary in a space of the shutter opening without contacting a wall surface of the shutter opening.

7. The optical filtering device according to claim 1, wherein the sticking prevention part has a wall surface structure configured to allow the wall surface of the shutter opening to retreat from a rotating shaft of the shutter.

8. A MEMS shutter comprising:

a shutter openable and closeable by voltage control; and a substrate having a shutter opening serving as a movable range of the shutter, wherein:

the substrate includes a sticking prevention part configured to prevent the shutter from sticking to a wall surface of the shutter opening when the shutter is opened;

the sticking prevention part is a protrusion disposed on the wall surface of the shutter opening;

the protrusion is disposed to extend over the entire of a thickness direction of the substrate; and any cross section in the thickness direction of the substrate has an approximately same shape.

* * * * *